(12) United States Patent
Brasket et al.

(10) Patent No.: US 9,900,499 B2
(45) Date of Patent: Feb. 20, 2018

(54) TIME LAPSE USER INTERFACE ENHANCEMENTS

(71) Applicant: Apple Inc., Cupertino, CA (US)

(72) Inventors: Jeffrey A. Brasket, San Francisco, CA (US); Behkish J. Manzari, San Francisco, CA (US); Elliott B. Harris, San Francisco, CA (US); Justin S. Titi, Morgan Hill, CA (US); Graham R. Clarke, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 180 days.

(21) Appl. No.: 14/718,587

(22) Filed: May 21, 2015

(65) Prior Publication Data
US 2016/0344927 A1    Nov. 24, 2016

(51) Int. Cl.
*H04N 5/232* (2006.01)

(52) U.S. Cl.
CPC ..... *H04N 5/23219* (2013.01); *H04N 5/23232* (2013.01); *H04N 5/23241* (2013.01); *H04N 5/23251* (2013.01); *H04N 5/23293* (2013.01)

(58) Field of Classification Search
CPC .......... H04N 5/23219; H04N 5/23251; H04N 5/23232; H04N 5/23293; H04N 5/23241
See application file for complete search history.

(56) References Cited

U.S. PATENT DOCUMENTS

| | | |
|---|---|---|
| 6,950,600 B2 | 9/2005 | Dietz |
| 8,144,763 B2 | 3/2012 | Falk |
| 2014/0105564 A1 | 4/2014 | Johar |
| 2014/0186006 A1 | 7/2014 | Jin |
| 2015/0043893 A1* | 2/2015 | Nishizaka ............ G11B 27/005 386/278 |

OTHER PUBLICATIONS

"OSnap! Features", http://www.osnapphotoapp.com/, retrieved on Aug. 21, 2014 from http://www.osnapphotoapp.com/features.php, pp. 1-2.

* cited by examiner

*Primary Examiner* — Twyler Haskins
*Assistant Examiner* — Angel L Garces-Rivera
(74) *Attorney, Agent, or Firm* — Blank Rome LLP (57) ABSTRACT

Disclosed herein are systems, methods, and non-transitory computer-readable storage media for providing visual indication that the image capture device is actively recording frames for a time lapse output sequence by providing indicia that communicates to a user that the image capture device is actively recording frames for the time lapse output sequence. Allowing user to perform time lapse sequence captures with a simple set up and with auto-adjustments when events occur that might otherwise detract from output quality.

31 Claims, 10 Drawing Sheets

TIME LAPSE USER INTERFACE ENHANCEMENTS

BACKGROUND

1. Technical Field

The present disclosure relates to media capture and more specifically to capturing a sequence of images.

2. Introduction

Time lapse photography involves capturing images of a scene over a period of time, piecing the captured images together into a sequence, and displaying the sequence over shorter period of time than was captured, thereby creating an effect in the scene of time appearing to progress faster.

Oftentimes photographers chose to capture a large number of images at regular intervals and over a long period of time and then set the playback speed to be very fast to create a dramatic time lapse effect. However, the length of time required to capture the large number of images can cause the photographer to become concerned about whether the image capture device is actually capturing images according to the desired settings.

Additionally, determining the proper settings for setting up a time lapse image capture setting can be complicated. For example, determining how often to capture an image and how much time to set aside for image capture can be a daunting task—especially for novice or casual photographers. Likewise, avoiding events during an image capturing session that can detract from the continuity and image quality of playback is also difficult.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for providing visual indication that the image capture device is actively recording frames for a time lapse output sequence by providing indicia that communicates to a user that the image capture device is actively recording frames for the time lapse output sequence.

The present technology can involve capturing a sequence of frames with a camera in a time lapse mode and displaying a live view of the scene. Along with the live view, an animation can be presented to indicate that the sequence of time lapse frames is actively being captured.

To conserve the camera's battery the live view of the scene can be suspended after a given time, but when the camera detects a user, a visual queue can be displayed to provide the user with reassurance that the camera has been capturing frames despite the view being suspended. Detecting a user can involve a user pressing a physical shutter button, pressing a virtual shutter button, detecting a user within the proximity of the camera, voicing a wake command, remotely waking the device, etc.

The visual queue displayed to provide the user with reassurance that the camera has been capturing frames despite the view being suspended can be the playback of a tail portion of the already-captured sequence of frames. Displaying the tail portion can involve displaying a first portion of the frames in the tail portion at a first rate, gradually increasing the first rate to a higher, second rate, detecting a threshold closeness to the end of the tail portion, and gradually decreasing the second rate to a third rate that is slower than the second rate. When the end of the tail portion is reached, a live view of the scene can be displayed, the tail portion can be looped, the captured sequence can be looped from the beginning, etc.

Some embodiments of the present technology involve time lapse image capture using a dynamic capture rate that avoids having to calculate a capture rate. Using a dynamic capture rate involves capturing a sequence of time lapse frames of a scene at a capture rate that changes according to a thresholding scheme that decreases the capture rate after a threshold period of time. After detecting the expiration of the threshold period, the dynamic capture rate can decrease to a lesser capture rate.

Similarly, the camera can automatically replace frames captured within a threshold time window around a motion event and build a time lapse output sequence with the replacement frame. The camera can capture a burst of multiple images for each frame in the sequence of time lapse frames and select a best image from the burst.

Some embodiments of the present technology involve a scene analyzer configured to examine the frames and detect an interesting image aspect of an image in the captured time lapse frames and modify an output image sequence to slow down and highlight the interesting frame. Also, additional frames from a burst of multiple images near the interesting frame can be injected into the playback sequence. The scene analyzer can examine the frames and detect a high level of activity in the frames relative to each other and can extend a default playback duration to capture more of the action.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses the need in the art for providing visual indication that the image capture device is actively recording still frames for a time-lapse output. A system, method and non-transitory computer-readable media are disclosed which cause a image capture device to provide indicia that communicates to a user that the image capture device is actively recording still frames for a time-lapse output.

Figure 1A:
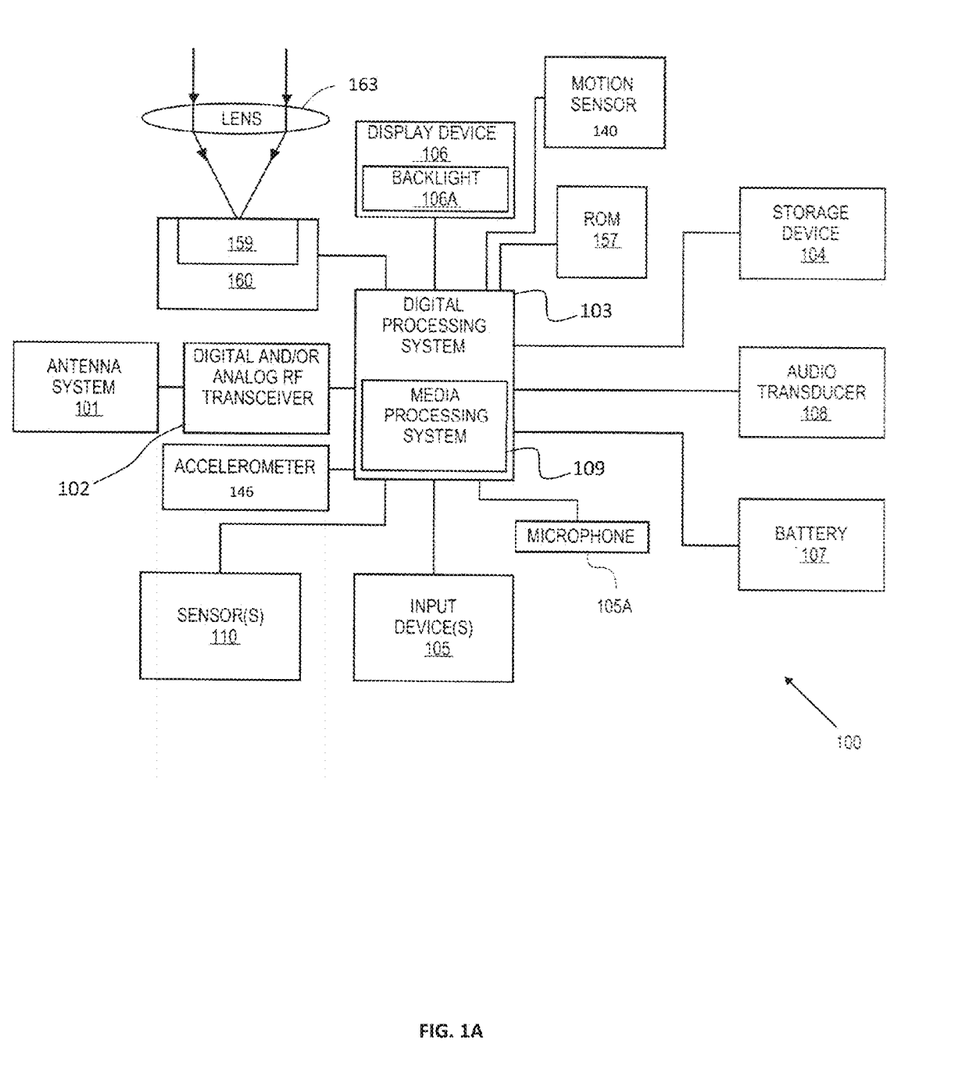
FIG. 1A shows an exemplary image-capturing device for capturing images and time lapse sequences of images using a digital processing system.
Figure 1B:
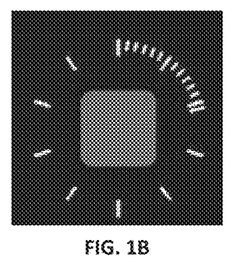
FIGS. 1B, 1C, 1D, 1E, 1F, 1G, 1H, 1I, and 1J illustrate an exemplary animation displayed on an image capturing device in a time lapse frame capturing mode according to some embodiments of the present technology.
Figure 1C:
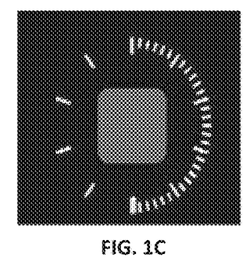
Figure 1D:
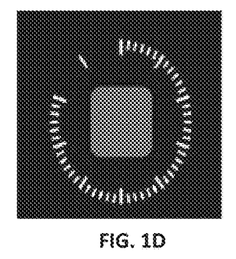
Figure 1E:
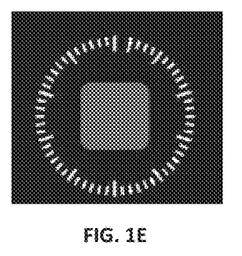
Figure 1F:
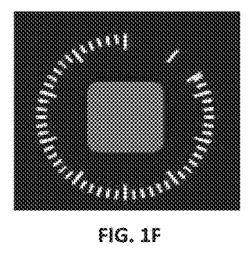
Figure 1G:
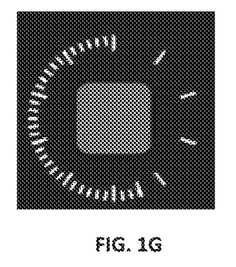
Figure 1H:
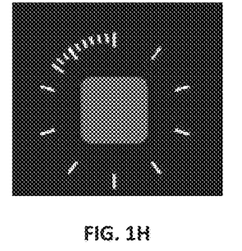
Figure 1I:
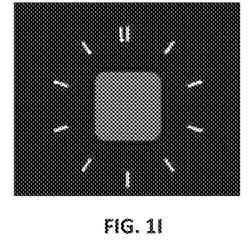
Figure 1J:
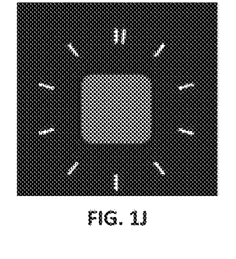

FIG. 1A shows an exemplary image-capturing device 100 for capturing images and time lapse sequences of images using a digital processing system 103. The digital processing system 103 may include a media processing system 109, which may also include a general purpose or special purpose processing system to manage media, such as image files, video files, files of audio data, etc.

The image-capturing device 100 may also include a storage device 104, coupled to the digital processing system, to store data and/or operating programs and capture images for the image-capturing device 100. The storage device 104 may be, for example, any type of solid-state or magnetic memory device. The storage device 104 may be or include a machine-readable medium.

A machine-readable medium includes any mechanism for storing or transmitting information in a form readable by a machine (e.g., a computer). For example, machines store and communicate (internally and with other devices over a network) code and data using machine-readable media, such as machine storage media (e.g., magnetic disks; optical disks; random access memory; read only memory; flash memory devices; phase-change memory).

The image-capturing device 100 may also include one or more input devices 105, coupled to the digital processing system 103. The input device 105 may be, for example, one or more of a keypad, a touchpad, a touch screen, a pointing device in combination with a display device or similar input device. The image-capturing device 100 may also include at least one display device 106, coupled to the digital processing system 103, to display information such as messages, telephone call information, contact information, pictures, images, movies and/or titles or other indicators of media being selected via the input device 105. The display device 106 may be, for example, an LCD display device. In some embodiments, the display device 106 and input device 105 may be integrated together in the same device (e.g., a touch screen LCD such as a multi-touch input panel which is integrated with a display device, such as an LCD display device). The display device 106 may include a backlight 106A to illuminate the display device 106 under certain circumstances. It will be appreciated that the image-capturing device 100 may include multiple displays.

The image-capturing device 100 may also include an accelerometer 146, and a motion sensor 140 (e.g., an accelerometer, a gyroscrope, a motion detector, a tilt sensor such as mercury switch, a compass, or any combination thereof) to determine motion information for the device. The processing system is configured to determine whether the device is moving based on the motion information.

The image-capturing device 100 may also include a battery 107 to supply operating power to components of the system including digital RF transceiver 102, digital processing system 103, storage device 104, input device 105, microphone 105A, audio transducer 108, media processing system 109, sensor(s) 110, and display device 106, and an image sensor 159 (e.g., CCD (Charge Coupled Device), CMOS based device). The image sensor may be integrated with an image processing unit 160. The display device 106 may include a Liquid Crystal Display (LCD), which may be used to display images that are captured or recorded by the wireless image-capturing device 100. The LCD serves as a viewfinder of a camera and there may optionally be other types of image display devices on device 100 which can serve as a viewfinder.

The image-capturing device 100 also includes an imaging lens 163 which can be disposed over image sensor 159. The processing system 103 controls the operation of the image-capturing device 100; and, it may do so by executing a software program stored in ROM 157, or in the processing system 103, or in both ROM 157 and the processing system 103.

The processing system 103 controls the image processing operation; and, it controls the storage of a captured image in storage device 104. The processing system 103 also controls the exporting of image data (which may or may not be color corrected) to an external general purpose computer or special purpose computer.

The processing system 103 also responds to user commands. For example, the processing system can respond to a command to record (aka "take") a picture, capture and record a sequence of image frames for time lapse playback, or capture video by capturing image(s) on the image sensor and storing the image(s) in memory or a command to select an option for contrast enhancement and color balance adjustment). The image-capturing device 100 can also include audio transducers 108, which may include one or more speakers, and at least one microphone 105A In some embodiments, the image-capturing device 100 includes the storage device 104 to store captured images, the lens 163 to receive incident light associated with an image to be captured, and the processing system 103 coupled to the storage device 104 and the lens 163. The device also includes a display device 106 coupled to the storage device 104. The display device can display the captured images.

The image sensor 159, the image processing unit, and the processing system 103 can be configured to continuously capture and process images of a scene. Also, as explained above, the display device 106 can include a backlight 106A to illuminate the display device 106 to display the captured images on the display device 106. The captured images can be displayed in essentially real time as a video of the scene to provide the user with a view of the scene. The processing system 103 can record one or more images of the scene by a user pressing a physical or virtual shutter button.

The processing system can also be operatively coupled with a time-lapse sequence builder, a scene analyzer, a motion data processor, an exposure setting module, a location information module, a storage conservation module, and frame handler—each of which are explained in greater detail below.

The processing system 103 can be configured, after entry into a time lapse mode, to capture and record a sequence of time lapse images. While in time lapse mode, the image capturing device 100 can continue to display captured images of the scene as a video. However, as explained above, there is a need in the art for providing visual indication that the image capture device is actively recording still frames for a time-lapse output.

FIGS. 1B-1J illustrates an exemplary animation displayed on an image capturing device in a time lapse frame capturing mode that provides a visual indication that frames are being recorded. The animation shown in FIGS. 1B-1J includes a button resembling a shutter button on an image capturing device with a series of hash marks spaced out in a ring surrounding the button and a rotation effect occurring as time passes. The rotation effect can involve additional lines filling in the spaces between the hash marks in a clockwise fashion as time passes until they reach a midnight position, the additional lines vanishing as time passes in a second clockwise rotation, and the effect repeating itself as the time lapse frame capturing mode continues to record frames. The speed of the rotation of the ring of lines can also be tied to the image capture rate, thereby indicating when the next image in a sequence will be captured (e.g. when the rotation effect reaches each hash mark, when the rotation effect reaches 12 o'clock, etc.).

Some embodiments of the present technology involve the image-capturing device 100 automatically or manually entering a time out mode. Referring again to FIG. 1A, the image-capturing device 100 can include a battery 107. The battery 107 may be, for example, a rechargeable or non-rechargeable lithium or nickel metal hydride battery. The time out mode can cause the display device 106 to fade in brightness or blackout.

However, when the display device 106 fades or blacks out, there is still a need for providing visual indication that the image capture device is actively recording still frames for a time-lapse output. Accordingly, the shutter button animation, the looping of all or a portion of the time lapse output sequence, or both can be displayed when the image-capturing device "wakes up" from a time out mode.

In addition to or alternatively, the visual indication that the image capture device is actively recording frames for a time-lapse output sequence can also include playing a portion or all of the recorded output sequence. In some embodiments of the present technology, playing or looping the time-lapse output sequence as the visual indication that the image capture device is actively recording frames can be performed when it is determined that a user has previously entered a time lapse mode and has subsequently returned to check in on the progress of the time lapse image capture sequence.

Determining to show a shutter animation or to play or loop the time-lapse output sequence to provide a can involve detecting that a user interacts with the image capture device. Detecting that the user interacts with the image capture device can involve receiving an input via a physical input element on the image capture device or receiving an input via a virtual interface element displayed on the image capture device's touch screen display.

Figure 2A:
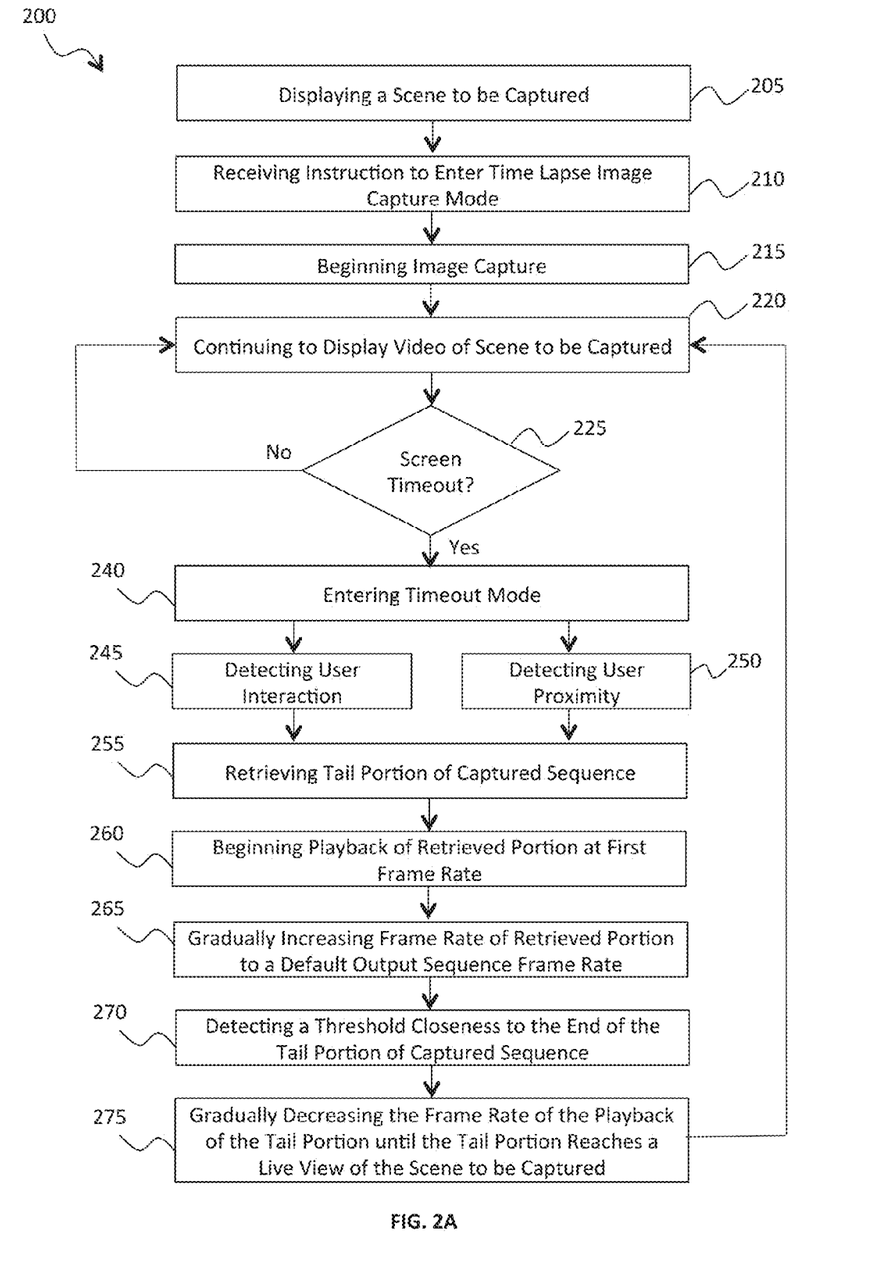
FIG. 2A illustrates a method of displaying a visual indication that the image capture device is actively recording frames for a time-lapse output sequence according to some embodiments of the present technology.

FIG. 2A illustrates a method 200 of displaying a visual indication that the image capture device is actively recording frames for a time-lapse output sequence according to some embodiments of the present technology.

The method 200 involves an image-capturing device receiving image data and displaying a scene to be captured 205. For example, the image-capturing device can process a plurality of scene frames and display video of a scene to be captured on a display of touch screen display of an electronic device. Next, the method 200 involves receiving an instruction to enter a time lapse image capture mode 210. In some embodiments, an instruction to enter a time lapse image capture mode can be received by a user selecting an interface element of a camera application running on the image-capturing device.

After receiving the instruction to enter the time lapse image capture mode, the method 200 can involve the image-capturing device beginning to capture images of the scene 215 at a certain interval. The interval can comprise a pre-determined frame rate. In some other embodiments, the interval is user-defined. After image capture is initiated, the method 200 can involve continuing to display video of the scene to be captured 220.

Next, the method 200 can involve enforcing a time out mechanism that can lock the image capturing device and can alter what is displayed in the image capturing device in order to conserve the device's power resources. At step 225, a determination is made as to whether to time out the screen. If not, the method 200 involves continuing to display video of the scene to be captured 220. Alternatively, if the screen times out, the method 200 involves entering a power saving mode 240. In some embodiments, the power saving mode involves timing out the screen from displaying video. For example, the screen can black out after a predetermined period of time while the image capturing device still records image frames. The time out mechanism can also involve a security feature that involve displaying a lock screen on the image capturing device that requires user-authentication before unlocking the device.

While in a timeout mode that causes the image capturing device from displaying video of the scene to be captured, a user can become concerns whether or not the image capturing device is still properly recording images in the time lapse mode. Accordingly, the present technology can provide visual feedback to the user that the time lapse recording is still be capturing images when a user performs an action to wake up the image capturing device.

In some embodiments of the present technology, the method 200 involves detecting physical interaction with the device 245 and detecting user proximity 250 as exemplary actions for waking up the image capturing device from a time out mechanism. For example, detecting physical interaction with the image capturing device can involve a user pressing a button on the device or an accelerometer detecting motion of the image capturing device. Also, the image capturing device can include one or more proximity sensors (e.g. infrared light emitting diode proximity sensors, inductive proximity sensors, etc.). Detecting a user can also involve a speech recognition system receiving a wake command, receiving a remote command for waking the device, etc.

After the user performs an action to wake up the image capturing device, the method 200 involves retrieving a tail portion of the captured time lapse sequence 255. In some embodiments, the tail portion of the captured sequence is pre-cached such that it is available immediately upon the user performing the action to wake up the image capturing device.

In some embodiments of the present technology, the tail portion is retrieved for playback according to a dynamic frame rate algorithm to provide a visual confirmation that the image capturing device is capturing frames in time lapse mode according to the user's expectations. Therefore the retrieved tail portion can include the number of frames that, when played according the dynamic frame rate algorithm result in a output sequence having a predetermined length (e.g. eight seconds).

The dynamic frame rate algorithm can be defined to provide a visually smooth playback and to avoid an abrupt or jarring visual ramp up or fade out. For example, the dynamic frame rate algorithm can also be defined to provide a gradual ramp up in frame rate of the time lapse output sequence of the tail end, a constant middle portion of the tail end output sequence, and a gradual ramp down of the tail end output sequence.

The method 200 can perform such a tail end output sequence by beginning playback of the retrieved tail portion at a first frame rate 260, gradually increasing the frame rate of the tail portion to a default output sequence frame rate 265, detecting a threshold closeness to the end of the retrieved tail portion of the output sequence 270, gradually decreasing the frame rate of the playback of the output sequence until the tail portion reaches a live view of the scene to be captured 275, and continuing to display video of the scene to be captured 220.

Figure 2B:
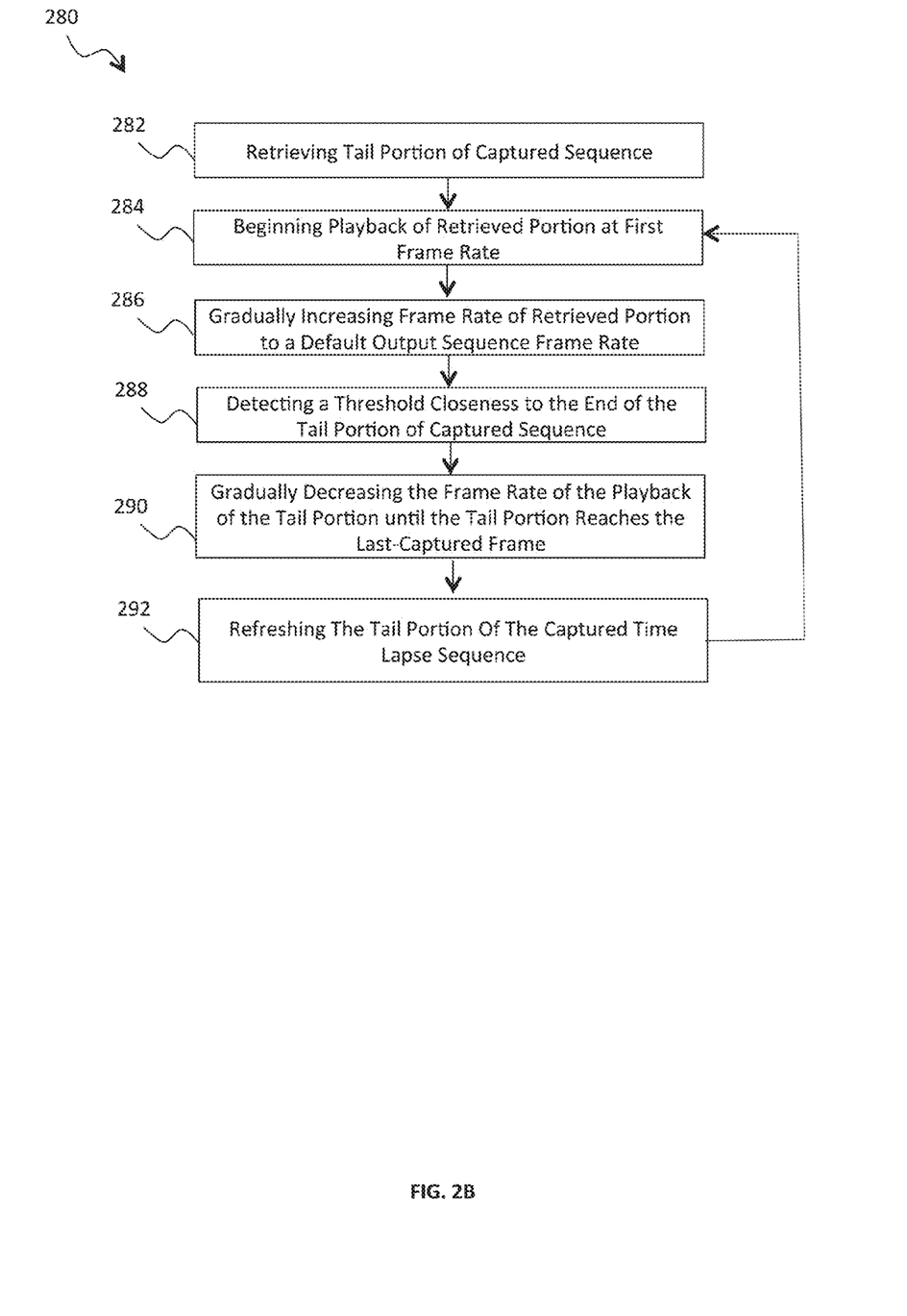
FIG. 2B illustrates another exemplary method of providing a visual confirmation that the image capturing device is capturing frames in time lapse according to some embodiments of the present technology.

FIG. 2B illustrates another exemplary method 280 of providing a visual confirmation that the image capturing device is capturing frames in time lapse according some embodiments of the present technology. The method 280 involves retrieving a tail portion of the captured time lapse sequence 282 and a dynamic frame rate algorithm that begins playback of the retrieved tail portion at a first frame rate 284, gradually increasing the frame rate of the tail portion to a default output sequence frame rate 286, detecting a threshold closeness to the end of the retrieved tail portion of the output sequence 288, gradually decreasing the frame rate of the playback of the output sequence until the tail portion reaches the last-captured frame 290, and refreshing the tail portion of the captured time lapse sequence 292 for looping the tail portion of the output sequence.

Figure 2C:
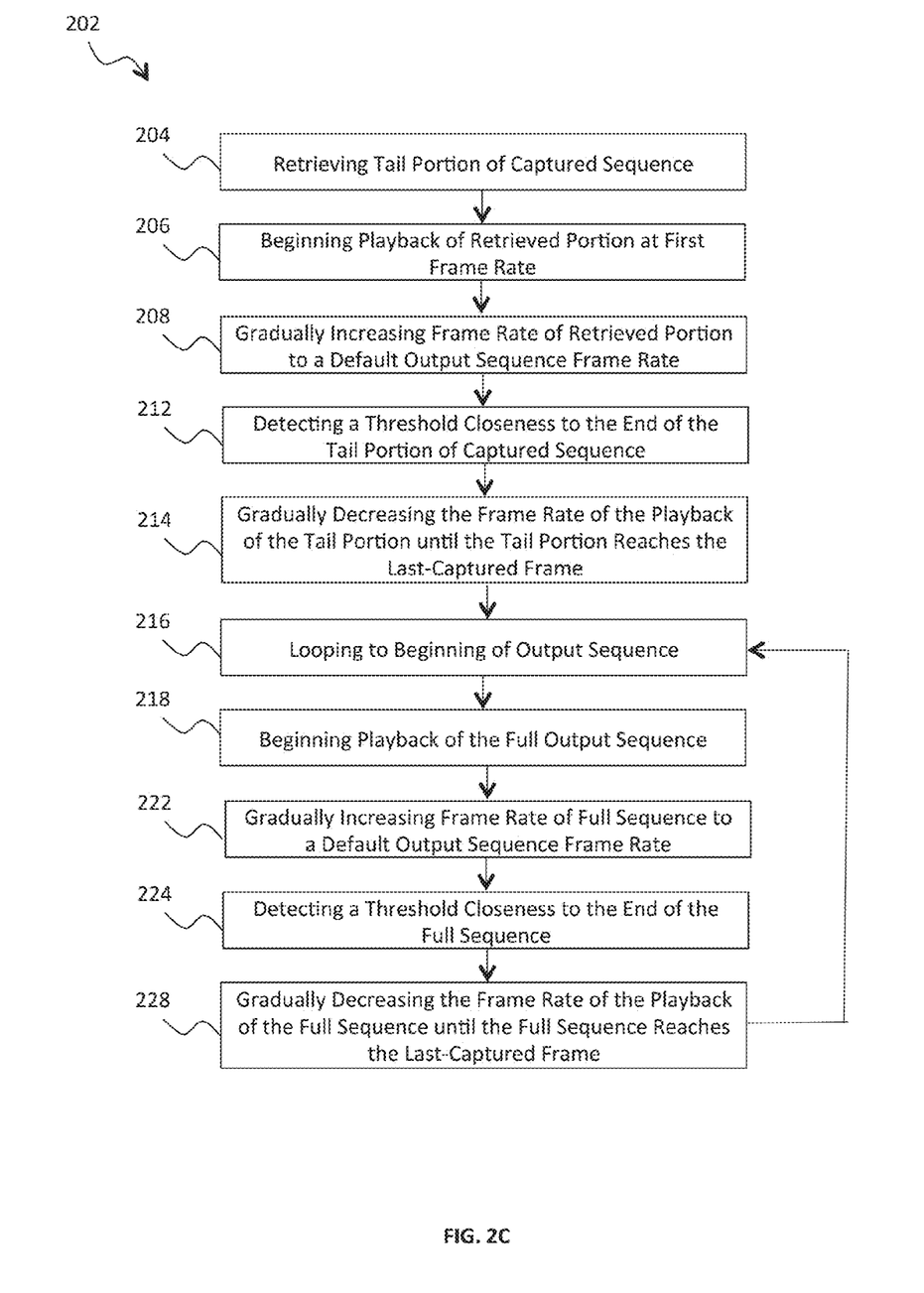
FIG. 2C illustrates another exemplary method of providing a visual confirmation that the image capturing device is capturing frames in time lapse according to some embodiments of the present technology.

FIG. 2C illustrates another exemplary method 202 of providing a visual confirmation that the image capturing device is capturing frames in time lapse according some embodiments of the present technology. The method 202 involves retrieving a tail portion of the captured time lapse sequence 204 and a dynamic frame rate algorithm that begins playback of the retrieved tail portion at a first frame rate 206, gradually increasing the frame rate of the tail portion to a default output sequence frame rate 208, detecting a threshold closeness to the end of the retrieved tail portion of the output sequence 212, gradually decreasing the frame rate of the playback of the output sequence until the tail portion reaches the last-captured frame 214. After the last-captured frame of the tail portion is displayed, the method 202 can loop to the beginning of the captured time lapse sequence 216, beginning playback of the full output sequence at a first frame rate 218, gradually increasing the frame rate of the full output sequence to a default output sequence frame rate 222, detecting a threshold closeness to the end of the full output sequence 224, gradually decreasing the frame rate of the playback of the full output sequence until the output sequence reaches the last-captured frame 228, and iterating to step 216.

The present disclosure also addresses the need in the art for simple set up and auto-adjustments when events occur that might otherwise detract from output quality. Systems, methods and non-transitory computer-readable media are disclosed which analyze a scene, analyze motion and acceleration data, analyze time lapse image capture duration, and build time lapse sequence outputs. These systems, methods and non-transitory computer-readable media can take the math and guesswork out of time lapse photography and can automatically adjust settings and truncate or replace frames, thereby enabling any user to create quality time lapse sequences.

Figure 3:
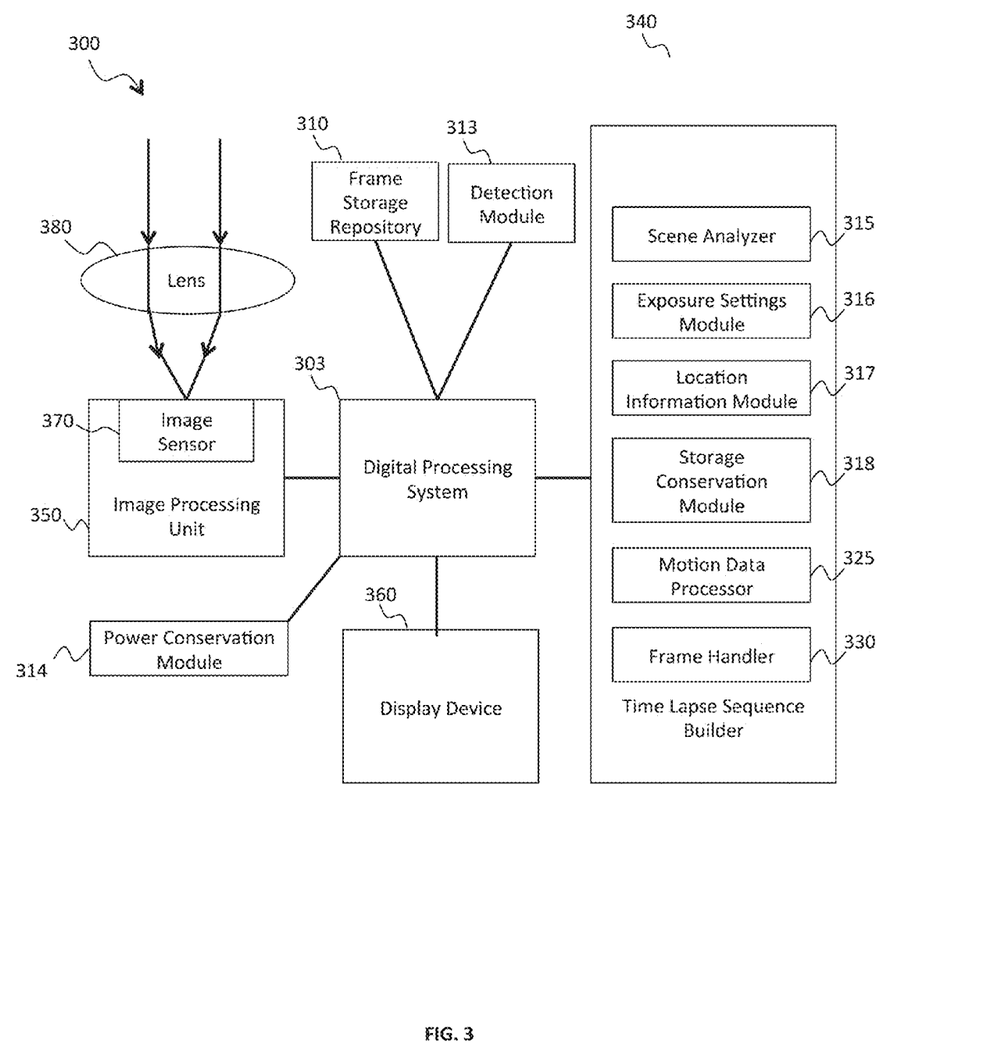
FIG. 3 illustrates a system for building a time lapse image sequence according to some embodiments of the present technology.

FIG. 3 illustrates a system 300 for building a time lapse image sequence according to some embodiments of the present technology. The system 300 includes a lens 380, an image sensor 370, an image processing unit 350, a digital processing system 303, and time lapse sequence builder 340. The image processing unit 350 receives image data from the image sensor and the digital processing system processes the image data into image frames and stores frames in a frame storage repository 310.

The system can include a power conservation module 314 configured to automatically suspend the display of the scene after a predetermined threshold time and a detection module 313 configured for detecting a user and causing the digital processing system 303 to provide a visual confirmation that the image capturing device is capturing frames, as explained above.

The digital processing system 303 can also be coupled with a time-lapse sequence builder 340 that can examine the frames and build an output sequence for display on a display device 360. The time-lapse sequence builder 340 can include a scene analyzer 315, a motion data processor 325, an exposure setting module 316, a location information module 317, a storage conservation module 318, and frame handler 330.

In some embodiments of the present technology, the time lapse sequence builder 340 can define a default image capture rate based on a desired output sequence frame rate, a desired output sequence playback time, and an assumed minimum capture time. The assumed minimum capture time can comprise a minimum time that an average user will allow time lapse image capture to take place before ending the frame capture process. In some embodiments of the present technology, the assumed minimum capture time is empirically defined. For example, an image capturing device can comprise a network interface for transmitting time lapse capture data to a server that collects time lapse image capture data for a community of users, examines statistics relating to community usage of time lapse image capture, and that determines the average minimum capture time for the community.

For example, the time lapse sequence builder 340 can define a desired output sequence playback frame rate to be thirty frames per second and define the desired output sequence playback time to be ten seconds. When the time lapse sequence builder 340 uses an assumed minimum time of ten minutes, the time lapse sequence builder 340 sets the default image capture time to capture one frame every two seconds.

The time lapse sequence builder 340 can also examine a sequence of captured time lapse frames and determine how to build a playback sequence of frames. For example, the time lapse sequence builder can determine that a sequence of captured time lapse frames includes a requisite number of frames to create an output sequence at a desired frame rate (e.g. thirty frames per second). In some embodiments, when the time lapse sequence builder 340 determines that there is not enough frames to build a high quality sequence output, the time lapse sequence builder 340 can cause the image capturing device to store the captured frames as individual photos, use the captured frames to build a slide show, choose one or more of captured frames to store as photos while erasing the rest, etc.

In some embodiments of the present technology, a scene analyzer 315 is used to examine the images in the frames to identify patterns, correlations, common elements (or lack thereof) in the frames and the time-lapse sequence builder 340 determines how to output a sequence of frames based on the identified elements.

For example, when the scene analyzer 315 identifies that the frames of a time lapse sequence do not correlate enough with one another and, to avoid a choppy output sequence, the time-lapse sequence builder 340 determines to output the series of frames as a slide show instead of as a time lapse sequence. Alternatively, the scene analyzer 315 can identify that the frames of a time lapse sequence highly correlate enough with one another. For example, in a time lapse sequence of images of a car traveling down a highway, the images can all share the same horizon and can all include lane lines to provide consistency between the frames. In cases in which the scene analyzer 315 determines high correlation, the time lapse sequence builder 340 can adjust the output accordingly.

For example, the time lapse sequence builder 340 can determine that the number of frames captured during a time lapse frame capture session is not enough to produce an output sequence having a predetermined length and having a threshold frame rate. However, by virtue of the scene analyzer 315 determining a high correlation between frames, the time lapse sequence builder 340 can create a time lapse sequence output having a lesser frame rate, but that is nevertheless consistent looking by virtue of the visual similarities between the frames.

The scene analyzer 315 can also be used to examine the images in the frames to identify that a requisite amount of activity is occurring in the captured frames to justify the time-lapse sequence builder 340 building an output sequence that is longer than a default length. For example, the scene analyzer 315 can determine that the captured frames in a sequence of captured frames do not possess a threshold amount of activity (e.g. a scene of clouds in the sky) and the time lapse sequence builder 340 limits the output to a default output sequence time (e.g. thirty seconds). However, if the scene analyzer 315 determines that the frames capture a very dynamic set of scenes (e.g. a car ride through a busy city) then the time lapse sequence builder 340 can allow the output sequence to be longer than the default output sequence time.

In some embodiments of the present technology, the time lapse sequence builder 340 includes a motion data processor 325 configured to examine data describing the motion, or lack thereof, of the image capturing device while capturing image frames in a time lapse capture mode. The time lapse sequence builder 340 can use the motion data to determine how to build an image sequence. For example, if the motion data processor 325 determines that an accelerometer reported a threshold degree of shaking during image capture in a time lapse mode, the time lapse sequence builder 340 can determine that a time lapse image sequence output would not be consistent enough during playback and can decide to output the captured frames as a slideshow instead.

Also, the motion data processor 325 can provide motion data to the time lapse sequence builder 340 that results in the image capturing device capturing images at a higher frame rate in situations in which a higher frame rate would result in a higher quality output sequence. Similarly, the motion data processor 325 can provide motion data to the time lapse sequence builder 340 that results in the image capturing device capturing images for a time lapse image sequence having a longer duration than a default duration. For example, when the time lapse sequence builder 340 knows that the image capturing device is moving at a high rate of speed, the time lapse sequence builder 340 can decide that a longer output sequence would be acceptable due to the apparently more action-filed subject matter of the captured images.

Additionally, the time lapse sequence builder 340 can interpret motion data to determine whether the motion is acceptable, or even preferable, or whether frames affected by motion events should be trimmed or replaced. In some cases, the motion data processor 325 can receive contextual information about motion data and the time lapse sequence builder 340 can use the contextual information to build an output sequence. For example, in the case of the image capturing device being integrated in a smartphone, if the motion data processor 325 detects a motion event along with receiving contextual information about the motion event being associated with the smart phone being used to receive a phone call, the time lapse sequence builder 340 can decide to pause image capture until the phone application is not longer in use. On the other hand, if a text messaging application is used around the motion event, the time lapse sequence builder 340 can keep the image capture active while truncating frames affected by the motion event since the text messaging application will likely be used for less of a duration than the phone application.

The motion data processor 325 can detect significant amount of motion near the beginning and ending of a frame sequence capture. These significant motion events can be associated with a user pressing a button on the image capture device to initiate and end frame sequence capture and chose to trim those frames.

Figure 4:
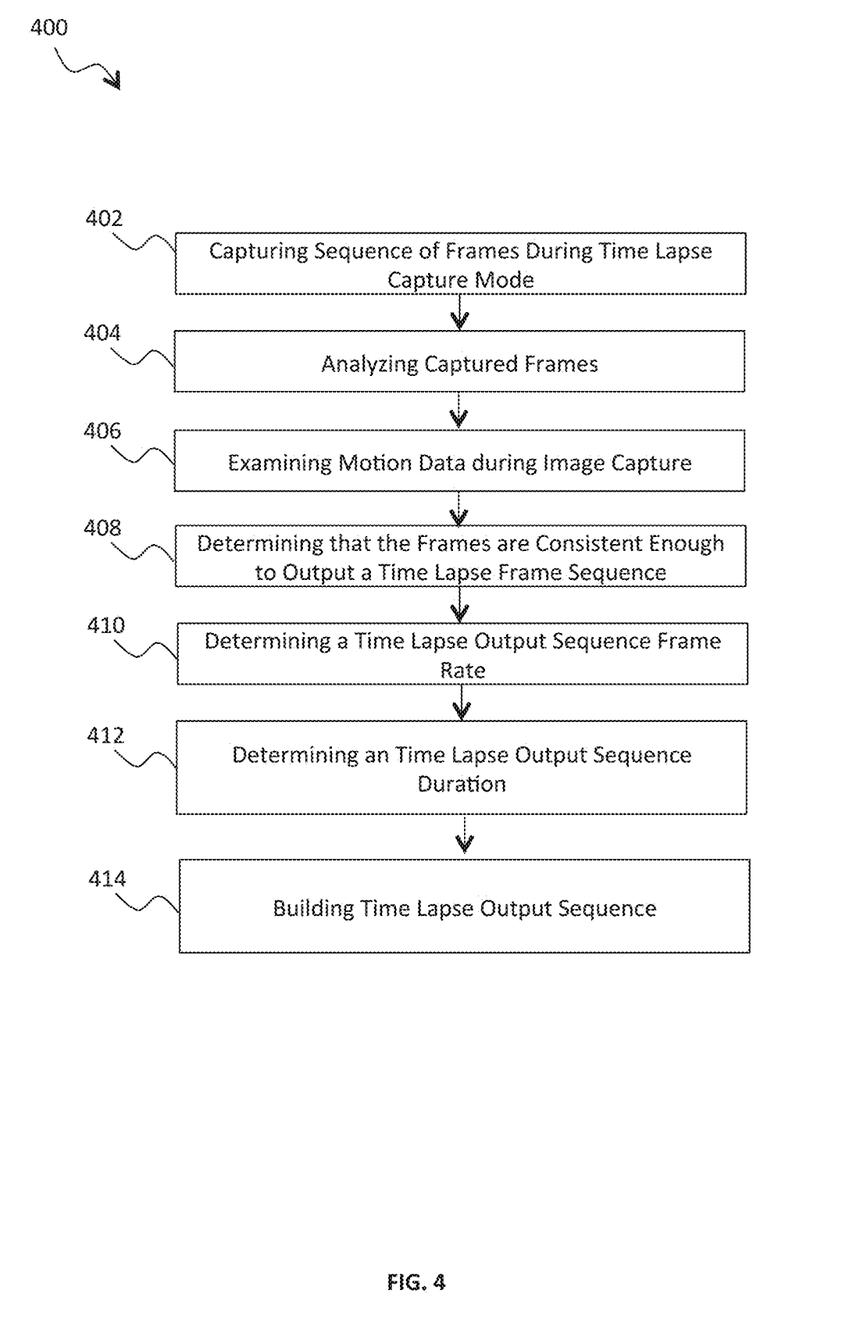
FIG. 4 illustrates a method of analyzing captured frames and building an output time lapse sequence according to some embodiments of the present technology.

FIG. 4 illustrates a method 400 of analyzing captured frames and building an output time lapse sequence according to some embodiments of the present technology. The method 400 involves an image capturing device capturing a sequence of image frames while in a time lapse capture mode 402 and analyzing the captured frames 404. For example, analyzing captured frames can involve determining the presence of consistencies in the frames, determining a degree of activity in the scenes captured, etc. The method 400 also involves examining motion data 406 from the image capture device during the time that the sequence of frames was captured.

Using the scene analysis data and the motion data, the method 400 can involve determining that the frames are consistent enough to output a time lapse image sequence 408, determining a time lapse output sequence frame rate 410, determining a time lapse output sequence duration 412, and building the time lapse output sequence 414.

Referring again to FIG. 3, the scene analyzer 315 can also analyze the frames of a sequence during the time the image capturing device is capturing the frames or after the sequence has been captured. In some embodiments of the present technology, the scene analyzer 315 can detect objects or events in a frame that can cause the time lapse sequence builder to change the rate of image capture and the frame rate of the output sequence. For example, while capturing a scene, the scene analyzer can detect a particular face and can speed up frame capture rate to capture more frames of the particular face. Similarly, the time lapse sequence builder 340 can slow down playback frame rate around interesting events, as determined by the scene analyzer. For example, in an output sequence when the sequence includes long periods of inactivity and one or more short burst of activity, the time lapse sequence builder 340 can slow down playback near the events. Similarly, in an output sequence of a party, the time lapse sequence builder 340 can slow down playback each time the scene analyzer detects a new face.

In another example, after capturing a night sequence of stars moving in the sky, the scene analyzer can detect the presence of meteorites in one or more frames and the time lapse sequence builder can automatically slow down the frame rate or temporarily pause the output sequence to highlight the frames showing the meteorites such that an observer will not miss those frames.

The time lapse sequence builder 340 can also include an exposure settings module 316. During frame capture while in a time lapse capture mode the scene analyzer 315 can analyze the frames as they are captured to determine changes in lighting in the frames. For example, a time lapse sequence of a scene of the setting sun can result in frames that become progressively darker. Upon detecting one or more changes to the scene's lighting, the exposure settings module 316 can automatically and dynamically adjust the exposure settings of the image capture device. For example, during frame capture of a scene of a setting sun, the exposure settings module 316 can adjust the focus of the image capture device (e.g. to focus on the sun itself once its brightness will not wash out the image) as well as ISO settings, aperture settings, shutter speed, etc.

In some embodiments of the present technology, the time lapse sequence builder 340 can also include a location information module 317. The location information module 317 can be configured to receive information about the location of the image capturing device (e.g. from a GPS) and determine information about the location that can be sent to the time lapse sequence builder 340. For example, the location information module 317 can receive location information and determine information about the weather, times of sunset and sunrise, etc. The location information can be used by the time lapse sequence builder 340 and the exposure settings module 316 to automatically adjust time lapse capture settings and exposure settings.

As explained above, the time lapse sequence builder 340 can include a storage conservation module 318 that can be configured for enforcing frame storage and frame capture rules to ensure that the image capturing device has adequate storage resources to store sequence frames. For example, during a long session of capturing time lapse frames, the storage conservation module 318 can instruct the image capturing device to begin capturing frames at a lesser frame rate to avoid the storage resources of the image capturing device from quickly filling up.

Figure 5:
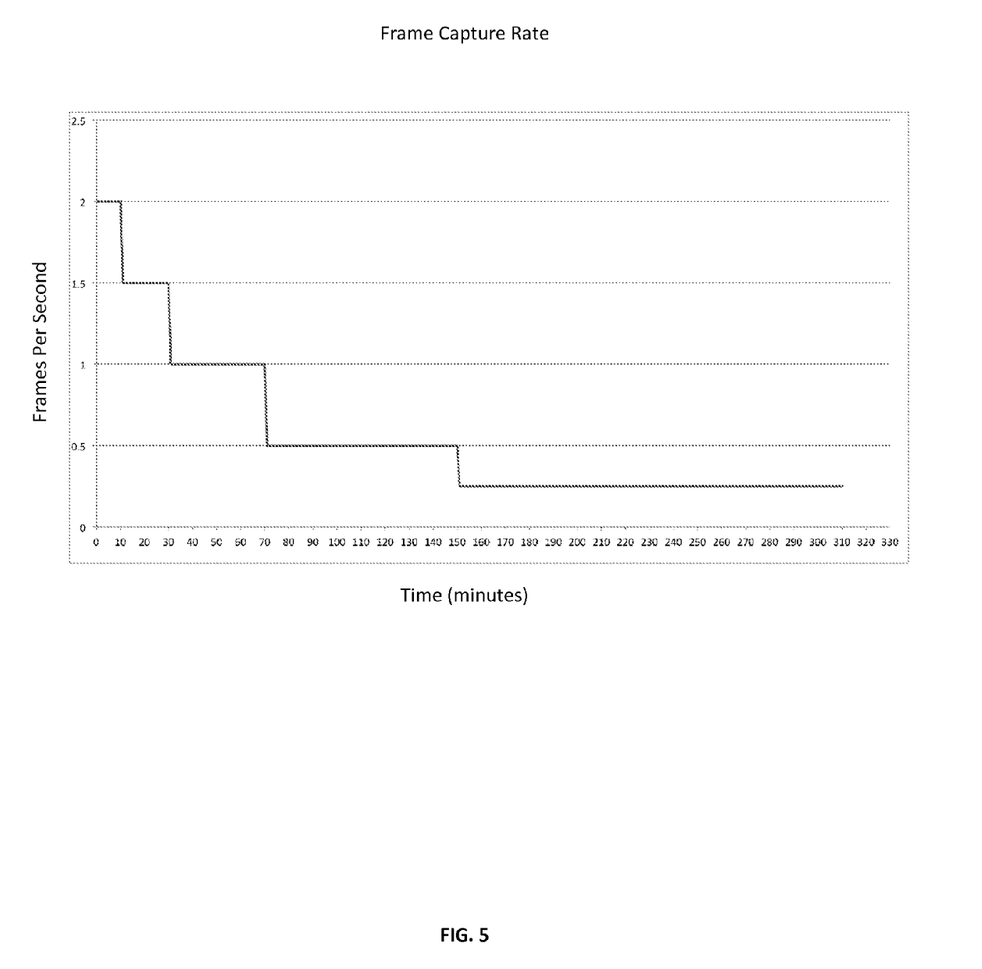
FIG. 5 illustrates an exemplary chart illustrating a default frame capture rate that decreases over time to enforce a storage conservation policy according to some embodiments of the present technology.

FIG. 5 illustrates an exemplary chart illustrating a default frame capture rate that decreases over time to enforce a storage conservation policy according to some embodiments of the present technology. As shown, the storage conservation policy can begin with a starting frame capture rate (e.g. two frames per second) and can decrease the rate (e.g. in half) after predetermined periods of time (e.g. ten minutes, twenty minutes, forty minutes, eighty minutes, etc.). In some cases, the storage conservation policy can also define a time at which the frame capture rate will remain steady (e.g. 0.1 frame per second). Alternatively, the storage conservation policy can cause the frame capture rate to continually decrease. The image capture device can also put itself into a sleep state during large intervals between frame captures to conserve power.

Referring again to FIG. 3, the time lapse sequence builder 340 can receive information from the storage conservation module 318 about changes to the default frame capture rate and can decide to truncate sequence frames captured at a higher capture rate such that the number of frames per time period matches frames captured at a lesser capture rate, thereby building an output sequence having a consistent frame rate. Accordingly, the time lapse sequence builder 340 can include a frame handler 330 for selectively truncating captured frames to fulfill one or more sequence building policy.

In some embodiments of the present technology, the frame handler 330 can selectively truncate frames from earlier portions of a frame capture sequence based on a lesser frame capture rate in a later portion of the frame capture sequence. For example, with reference to the chart illustrated in FIG. 5, when a frame capture sequence lasts seventy minutes, one thousand two hundred frames are captured at during the first ten minute interval, nine hundred frames are captured during each of the next two ten minute intervals, and six hundred frames are captured during each of the next four ten minute intervals. Without truncating frames from this captured sequence would result in an inconsistent playback. Therefore, the frame handler 330 can selectively truncate frames from the first ten-minute interval and from the next two ten-minutes intervals to match the frame rate of the final four ten minute intervals. The frame handler 330 can automatically delete a portion of the captured time lapse frames that were captured at a first capture rate that does not approximately match a second capture rate associated with the remaining portion of the captured time lapse frames.

In some embodiments of the present technology, the frame handler 330 truncates frames to match the spacing as close as possible to the lesser frame rate portions. For example, in a frame sequence of a night sky having a first portion of the sequence being captured at two frames per second and a second portion of the sequence being captured at one frame per second, the frame handler can truncate every other frame from the first portion such that the output sequence has a consistent frame rate.

However, in some other embodiments, the scene analyzer 315 can inspect the frames in the portions being truncated and select frames for truncation. For example, in the same frame sequence of a night sky as above, the scene analyzer 315 can determine that one or more frame that would be truncated under the above scheme contains an artifact resembling a meteorite. The scene analyzer 315 can instruct the frame handler 330 to instead truncate a neighboring frame in favor of keeping the frame containing the meteorite.

The scene analyzer 315 can examine frames and make decisions affecting truncation of frames based on image quality, interesting features (e.g. meteorite, something obscuring camera, face recognition, playback continuity, etc.

The frame handler 330 can also use data from the motion data processor 325 to make decisions about truncating frames. For example, the motion data processor 325 can detect motion events, the scene analyzer can inspect the frames surrounding the motion event, and the frame handler 330 can balance the considerations of frame quality and playback continuity and build the output sequence.

Some embodiments of the present technology involve capturing a burst of frames at regular intervals and selecting a best frame from the burst to use in an output time lapse sequence. For example, when a time lapse mode causes a image capturing device to capture a frame one every five seconds, the image capturing device can take a burst of images each five seconds, the scene analyzer 315 can select the best frame from the burst, and the frame handler 330 can truncate the rest of the burst.

As explained above, the image capturing device can include a display. In some embodiments of the present technology, the image capturing device can also include an user editor module for displaying user-facing tools for allowing users to trim frames, select and replace frames, adjust capture settings, adjust exposure settings, etc.

Figure 6A:
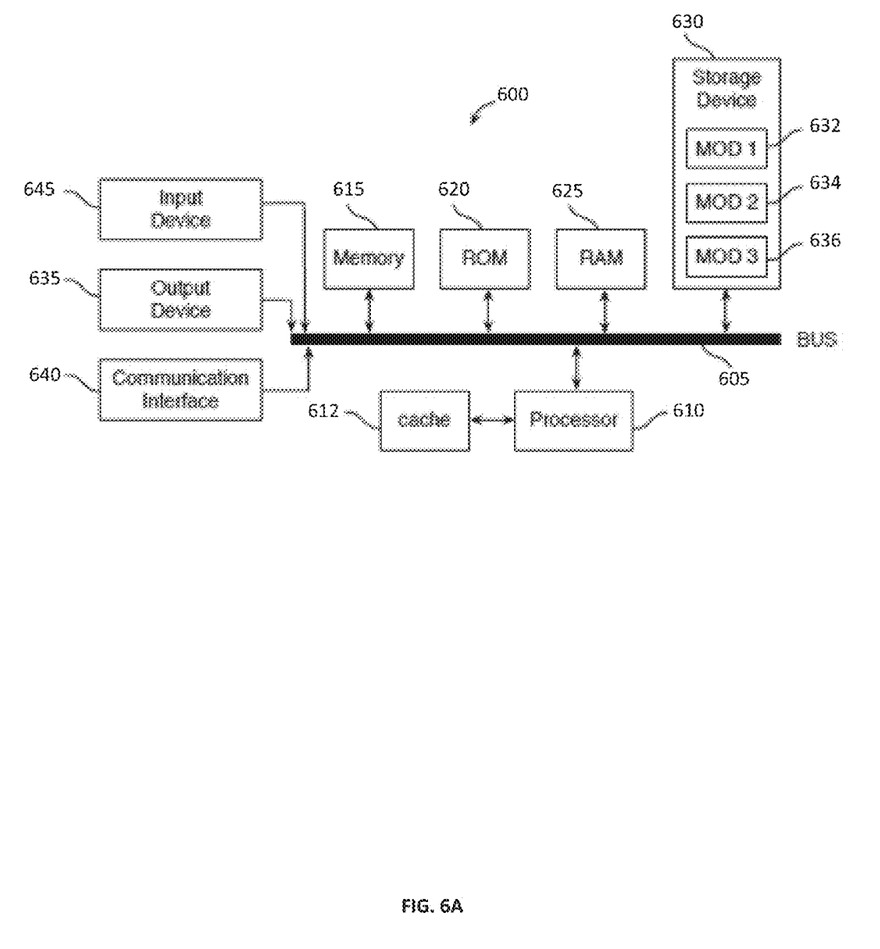
FIG. 6A and FIG. 6B illustrate exemplary possible system embodiments.
Figure 6B:
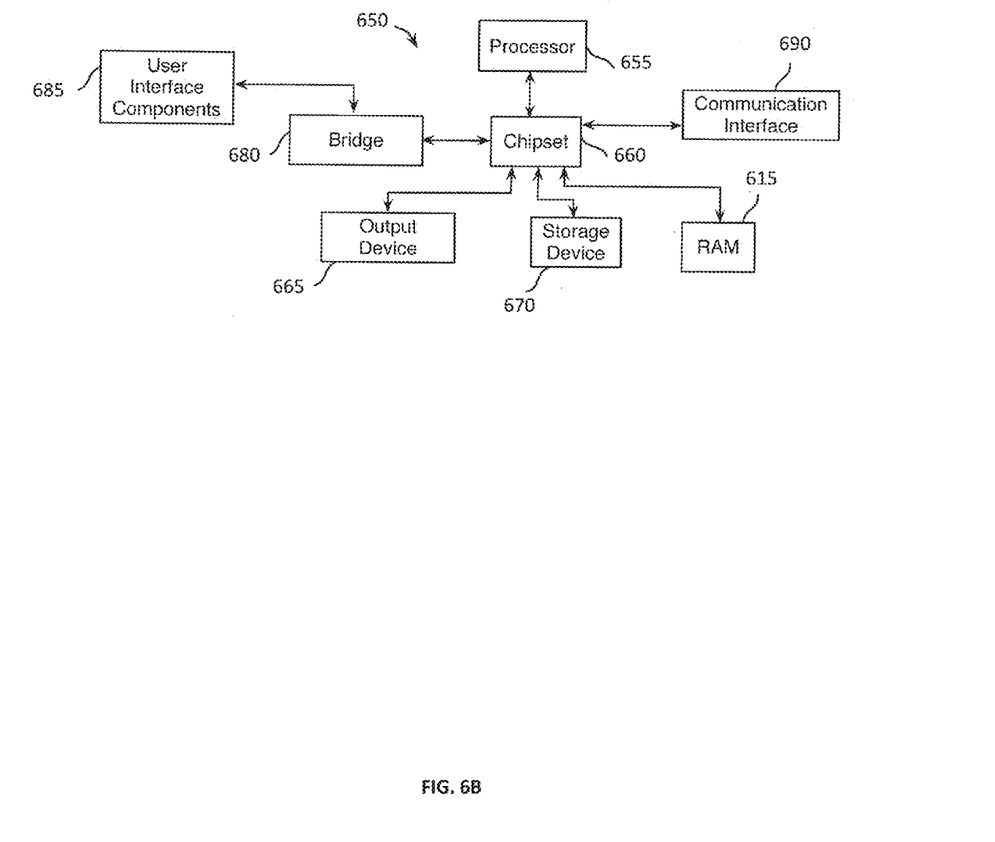

FIG. 6A and FIG. 6B illustrate exemplary possible system embodiments. The more appropriate embodiment will be apparent to those of ordinary skill in the art when practicing the present technology. Persons of ordinary skill in the art will also readily appreciate that other system embodiments are possible.

FIG. 6A illustrates a conventional system bus computing system architecture 600 wherein the components of the system are in electrical communication with each other using a bus 605. Exemplary system 600 includes a processing unit (CPU or processor) 610 and a system bus 605 that couples various system components including the system memory 615, such as read only memory (ROM) 620 and random access memory (RAM) 625, to the processor 610. The system 600 can include a cache of high-speed memory connected directly with, in close proximity to, or integrated as part of the processor 610. The system 600 can copy data from the memory 615 and/or the storage device 630 to the cache 612 for quick access by the processor 610. In this way, the cache can provide a performance boost that avoids processor 610 delays while waiting for data. These and other modules can control or be configured to control the processor 610 to perform various actions. Other system memory 615 may be available for use as well. The memory 615 can include multiple different types of memory with different performance characteristics. The processor 610 can include any general purpose processor and a hardware module or software module, such as module 1 632, module 2 634, and module 3 636 stored in storage device 630, configured to control the processor 610 as well as a special-purpose processor where software instructions are incorporated into the actual processor design. The processor 610 may essentially be a completely self-contained computing system, containing multiple cores or processors, a bus, memory controller, cache, etc. A multi-core processor may be symmetric or asymmetric.

To enable user interaction with the computing device 600, an input device 645 can represent any number of input mechanisms, such as a microphone for speech, a touch-sensitive screen for gesture or graphical input, keyboard, mouse, motion input, speech and so forth. An output device 635 can also be one or more of a number of output mechanisms known to those of skill in the art. In some instances, multimodal systems can enable a user to provide multiple types of input to communicate with the computing device 600. The communications interface 640 can generally govern and manage the user input and system output. There is no restriction on operating on any particular hardware arrangement and therefore the basic features here may easily be substituted for improved hardware or firmware arrangements as they are developed.

Storage device 630 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 625, read only memory (ROM) 620, and hybrids thereof.

The storage device 630 can include software modules 632, 634, 636 for controlling the processor 610. Other hardware or software modules are contemplated. The storage device 630 can be connected to the system bus 605. In one aspect, a hardware module that performs a particular function can include the software component stored in a computer-readable medium in connection with the necessary hardware components, such as the processor 610, bus 605, display 635, and so forth, to carry out the function.

FIG. 6B illustrates a computer system 650 having a chipset architecture that can be used in executing the described method and generating and displaying a graphical user interface (GUI). Computer system 650 is an example of computer hardware, software, and firmware that can be used to implement the disclosed technology. System 650 can include a processor 655, representative of any number of physically and/or logically distinct resources capable of executing software, firmware, and hardware configured to perform identified computations. Processor 655 can communicate with a chipset 660 that can control input to and output from processor 655. In this example, chipset 660 outputs information to output 665, such as a display, and can read and write information to storage device 670, which can include magnetic media, and solid state media, for example. Chipset 660 can also read data from and write data to RAM 675. A bridge 680 for interfacing with a variety of user interface components 685 can be provided for interfacing with chipset 660. Such user interface components 685 can include a keyboard, a microphone, touch detection and processing circuitry, a pointing device, such as a mouse, and so on. In general, inputs to system 650 can come from any of a variety of sources, machine generated and/or human generated.

Chipset 660 can also interface with one or more communication interfaces 690 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 655 analyzing data stored in storage 670 or 675. Further, the machine can receive inputs from a user via user interface components 685 and execute appropriate functions, such as browsing functions by interpreting these inputs using processor 655.

It can be appreciated that exemplary systems 600 and 650 can have more than one processor 610 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The various embodiments described above are provided by way of illustration only and should not be construed to limit the scope of the disclosure. Those skilled in the art will readily recognize various modifications and changes that may be made to the principles described herein without following the example embodiments and applications illustrated and described herein, and without departing from the spirit and scope of the disclosure.

We claim:

1. An electronic device comprising:
  a camera configured to capture a sequence of time lapse frames of a scene during a time lapse capture mode;
  a display;
  a processor configured to cause the display to present a live view of the scene on the display while in the time lapse capture mode and to automatically suspend the display after a predetermined threshold time;
  a storage repository to store the captured sequence of time lapse frames; and
  a detection module configured to detect a user;
  wherein the processor is further configured to:
    automatically retrieve, in response to detecting the user, a tail portion of the sequence of time lapse frames from the storage repository that comprises a predetermined number of frames at an end of the captured sequence,
    activate the display, and
    cause the activated display to playback the retrieved sequence of time lapse frames.

2. The electronic device of claim 1, wherein the processor is further configured to cause the display to present an animation along with the live view, the animation indicating that the camera is actively capturing the sequence of time lapse frames.

3. The electronic device of claim 1, further comprising a physical shutter button and wherein the detection module is configured to detect the user by detecting the user pressing the shutter button.

4. The electronic device of claim 1, wherein one or more of the display and the camera comprises a touch screen and wherein the detection module is configured to detect the user by detecting the user pressing a virtual button on the touch screen.

5. The electronic device of claim 1, further comprising a proximity sensor and wherein the detection module is configured to detect a user based on the proximity sensor detecting the user within a predetermined threshold proximity of the proximity sensor.

6. The electronic device of claim 5, wherein the proximity sensor comprises an infrared light emitting diode (LED) proximity sensor.

7. The electronic device of claim 1, wherein the processor is further configured to cause the display to automatically present a first portion of the frames in the tail portion at a first rate, increase the first rate to a higher, second rate, detect a threshold closeness to the end of the tail portion, and decrease the second rate to a third rate that is slower than the second rate.

8. The electronic device of claim 7, wherein, when the end of the tail portion is reached, the processor is further configured to cause the display to present the live view of the scene.

9. The electronic device of claim 7, wherein, when the end of the tail portion is reached, the processor is further configured to loop the tail portion of the sequence.

10. The electronic device of claim 7, wherein, when the end of the tail portion is reached, the processor is further configured to cause the display to present a loop of the captured sequence.

11. A method comprising:
  capturing a sequence of time lapse frames of a scene using a camera;
  displaying a live view of the scene during the capturing;
  storing the captured sequence of time lapse frames in a storage repository;
  suspending the live view displaying of the scene after a predetermined threshold time;
  detecting a user;
  automatically retrieving, in response to detecting the user, a tail portion of the sequence of time lapse frames from the storage repository, the tail portion comprising a predetermined number of frames at an end of the captured sequence; and displaying the retrieved sequence of time lapse frames.

12. The method of claim 11, further comprising:
presenting an animation, along with the live view, that indicates that the sequence of time lapse frames is actively being captured.

13. The method of claim 11, wherein detecting a user comprises detecting the user pressing a shutter button associated with the camera.

14. The method of claim 11, wherein detecting a user comprises detecting the user within a threshold proximity of the camera.

15. The method of claim 14, wherein a proximity sensor is used for the detection.

16. The method of claim 15, wherein the proximity sensor comprises an infrared light emitting diode (LED) proximity sensor.

17. The method of claim 11, further comprising:
displaying a first portion of the frames in the tail portion at a first rate;
increasing the first rate to a higher, second rate;
detecting a threshold closeness to the end of the tail portion; and
decreasing the second rate to a third rate that is slower than the second rate.

18. The method of claim 17, further comprising displaying the live view of the scene when the end of the tail portion is reached.

19. The method of claim 17, further comprising looping the tail portion of the sequence when the end of the tail portion is reached.

20. The method of claim 17, further comprising displaying a loop of the captured sequence when the end of the tail portion is reached.

21. The method of claim 11, wherein detecting a user comprises detecting a user pressing a virtual button on a touch screen associated with the camera.

22. A non-transitory computer-readable storage medium storing instructions, the instructions comprising instructions that are executable by a computing device to:
capture a sequence of time lapse frames of a scene using a camera;
cause a display to present a live view of the scene during the capturing;
store the captured sequence of time lapse frames in a storage repository;
suspend the live view displaying of the scene after a predetermined threshold time;
detect a user;
automatically retrieve, in response to detecting the user, a tail portion of the sequence of time lapse frames from the storage repository, the tail portion comprising a predetermined number of frames at an end of the captured sequence; and
cause the display to present the retrieved sequence of time lapse frames.

23. The non-transitory computer-readable storage medium of claim 22, wherein the instructions comprise additional instructions that are executable by the computing device to cause the display to present an animation along with the live view, the animation indicating that the camera is actively capturing a sequence of time lapse frames.

24. The non-transitory computer-readable storage medium of claim 22, wherein the instructions that are executable by the computing device to detect a user comprise instructions that are executable by the computing device to detect a user pressing a shutter button associated with the camera.

25. The non-transitory computer-readable storage medium of claim 22, wherein the instructions that are executable by the computing device to detect a user comprise instructions that are executable by the computing device to detect a user pressing a virtual button on a touch screen associated with one or more of the camera and the display.

26. The non-transitory computer-readable storage medium of claim 22, wherein the camera comprises a proximity sensor and wherein the instructions that are executable by the computing device to detect a user comprise instructions that are executable by the computing device to detect a user within a predetermined threshold proximity of the proximity sensor.

27. The non-transitory computer-readable storage medium of claim 26, wherein the proximity sensor comprises an infrared light emitting diode (LED) proximity sensor.

28. The non-transitory computer-readable storage medium of claim 22, wherein the instructions comprise additional instructions that are executable by the computing device to:
cause the display to present a first portion of the frames in the tail portion at a first rate;
increase the first rate to a higher, second rate;
detect a threshold closeness to the end of the tail portion; and
decrease the second rate to a third rate that is slower than the second rate.

29. The non-transitory computer-readable storage medium of claim 28, wherein the instructions comprise additional instructions that are executable by the computing device to cause the display to present the live view of the scene when the end of the tail portion is reached.

30. The non-transitory computer-readable storage medium of claim 28, wherein the instructions comprise additional instructions that are executable by the computing device to cause the display to loop the tail portion of the sequence when the end of the tail portion is reached.

31. The non-transitory computer-readable storage medium of claim 28, wherein the instructions comprise additional instructions that are executable by the computing device to cause the display to present a loop of the captured sequence.

* * * * *